(12) United States Patent
Wason, Jr.

(10) Patent No.: US 11,578,928 B2
(45) Date of Patent: Feb. 14, 2023

(54) EVAPORATIVE COOLING FOR TRANSDUCER ARRAY

(71) Applicant: BAE Systems Information and Electronic Systems Integration Inc., Nashua, NH (US)

(72) Inventor: Charles P. Wason, Jr., Amherst, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1038 days.

(21) Appl. No.: 16/275,113

(22) Filed: Feb. 13, 2019

(65) Prior Publication Data

US 2020/0256622 A1   Aug. 13, 2020

(51) Int. Cl.
F28D 15/02 (2006.01)
F28D 15/04 (2006.01)
G01S 7/521 (2006.01)

(52) U.S. Cl.
CPC ......... *F28D 15/0275* (2013.01); *F28D 15/04* (2013.01); *G01S 7/521* (2013.01)

(58) Field of Classification Search
CPC ...... F28D 1/022; F28D 15/04; F28D 15/0275; F28D 2021/0028; G01S 7/521; F02D 41/1446; F02D 41/064; F02D 41/0255; F02D 41/0055; F02D 41/0007; F02D 29/06; F02D 41/068; F02D 41/02; F02D 29/00; F02D 21/08; F02D 41/021; F02D 41/0077; F02D 41/06; F02D 41/0047; F02D 35/00; F02D 2200/021; F02D 2041/026; F02D 2250/24; F02D 2200/503; F02D 2200/0802; F02B 63/04; F02B 73/00; H01L 21/76844; H01L 21/76831; H01L 21/76843; H01L 21/76862; H01L 21/76859;
(Continued)

(56) References Cited

U.S. PATENT DOCUMENTS 2,445,276 A   7/1948   Massa
3,739,327 A   6/1973   Massa
(Continued)

OTHER PUBLICATIONS

Miassa, Donald P., "An Overview of Electroacoustic Transducers," DPM Overview of Electroacoustic Transducers 120615.doc. 19 pages.

*Primary Examiner* — Daniel L Murphy
*Assistant Examiner* — Amie M Ndure
(74) *Attorney, Agent, or Firm* — Finch & Maloney PLLC; Gary McFaline (57) ABSTRACT

A transducer system includes a housing, an electromechanical transducer within the housing, a wicking material adjacent to a portion of the electromechanical transducer, and a coolant solution within the housing. The coolant solution transitions from a liquid phase to a gaseous phase in response to a temperature of the electromechanical transducer exceeding a threshold temperature. In some example cases, the coolant solution has a boiling point of less than about 60° C., which effectively defines the threshold temperature. The coolant solution may be chosen such that it remains a liquid during a first phase (cooling via conduction), and then evaporates during a second phase (cooling via conduction and convection) as the electromechanical transducer heats up.

7 Claims, 7 Drawing Sheets

(58) Field of Classification Search
CPC ......... H01L 21/76885; H01L 21/76802; H01L 21/76879; H01L 21/76865; H01L 21/76876; H01L 21/76882; H01L 21/7684; H01L 21/76841; F02N 11/04; F02N 2200/061; Y02T 10/12; Y02T 10/40

See application file for complete search history.

(56) References Cited

U.S. PATENT DOCUMENTS

| | | | | |
|---|---|---|---|---|
| 3,943,388 | A | | 3/1976 | Massa |
| 5,291,461 | A | * | 3/1994 | Boeglin ................. G10K 9/121 |
| | | | | 367/174 |
| 5,924,482 | A | * | 7/1999 | Edwards ............... H01L 23/427 |
| | | | | 165/104.31 |
| 8,235,096 | B1 | * | 8/2012 | Mahefkey .......... H05K 7/20336 |
| | | | | 165/104.33 |
| 9,267,743 | B2 | * | 2/2016 | Sugimoto .......... H05K 7/20581 |
| 9,423,188 | B2 | * | 8/2016 | Paschkewitz ........... B29C 35/16 |
| 2007/0211426 | A1 | * | 9/2007 | Clayton ................ H01L 23/473 |
| | | | | 361/689 |
| 2007/0211711 | A1 | * | 9/2007 | Clayton ................. H05K 1/189 |
| | | | | 370/360 |
| 2007/0212920 | A1 | * | 9/2007 | Clayton ............... H01R 12/721 |
| | | | | 439/326 |
| 2011/0073293 | A1 | * | 3/2011 | Gauthier ............... B06B 1/0618 |
| | | | | 165/185 |
| 2022/0280747 | A1 | * | 9/2022 | Shouldice ............. A61M 21/02 |

* cited by examiner

EVAPORATIVE COOLING FOR TRANSDUCER ARRAY

BACKGROUND

Sonar (short for sound navigation and ranging) is a nautical tool for exploring and mapping the ocean and other large bodies of water. Sonar uses sound waves that travel quickly through water and are bounced back by large objects in the water and by the ocean floor. By determining the return time and general direction of the returning sound waves, distances to various objects or to the ocean floor topology can be calculated. Sonar utilizes one or more electromechanical transducers to convert the sound waves into electrical energy, or, in the case of active sonar, to convert electrical energy into sound waves. There are a number of non-trivial issues associated with such systems.

BRIEF DESCRIPTION OF THE DRAWINGS

Features and advantages of embodiments of the claimed subject matter will become apparent as the following Detailed Description proceeds, and upon reference to the Drawings, in which:

Although the following Detailed Description will proceed with reference being made to illustrative embodiments, many alternatives, modifications, and variations thereof will be apparent in light of this disclosure.

DETAILED DESCRIPTION

Techniques are disclosed for cooling transducers, such as those used in a sonar array. In an embodiment, a transducer system includes a housing, an electromechanical transducer within the housing, a wicking material adjacent to a portion of the electromechanical transducer, and a coolant solution within the housing. In some such embodiments, the coolant solution has a boiling point of less than about 60° C., and transitions between liquid and gas phases, depending on the temperature of the electromechanical transducer. In particular, and according to some such embodiments, the coolant solution is chosen such that it remains a liquid during a first phase (cooling via conduction), and then evaporates during a second phase (cooling via conduction and convection) as the electromechanical transducer heats up. By passively cooling the electromechanical transducer with the coolant solution, the transducer can operate at higher duty cycles for a longer period of time compared to conventional designs that do not utilize the multi-phase coolant.

General Overview

As previously noted, there are a number of issues with sonar systems, particularly those that run in a continuous mode. In more detail, the transducers used in sonar systems can generate varying degrees of heat over a given period. The heat output becomes greater as the transmission duty cycle increases for active sonar systems. If too much heat is generated, it may degrade the performance of the transducer and decrease its lifetime. Sonar transducers typically operate at a duty cycle of around 10%-20% when generating the sound waves. However, bringing duty cycles closer to continuous operation, such as around 50%, around 75%, or around 90%, can be desirable for certain applications. At these higher duty cycles, the electromechanical transducers tend to heat up faster and the performance can suffer.

Thus, and in accordance with an embodiment of the present disclosure, a system is provided that includes a coolant solution within a housing along with an electromechanical transducer to provide both conductive cooling and convective cooling to the transducer as it operates. The coolant allows for heat transfer to occur in two phases—a conductive phase where the coolant is a liquid in contact with a portion of the transducer that heats up, and a convective phase where the coolant transitions to a gas as it evaporates once the transducer reaches a certain temperature. Due to the enclosed space in the housing around the transducer, the gaseous coolant can condense on the interior walls of the housing and replenish the liquid form of the coolant. Thus, the coolant of the system cycles between liquid and gas (or vapor) phases in a continuous manner in response to transducer temperature. Numerous configurations and applications will be apparent in light of this disclosure, including sonar systems suitable for military and commercial underwater applications and that can run in a continuous mode having a duty cycle in excess of 50%.

Figure 1:
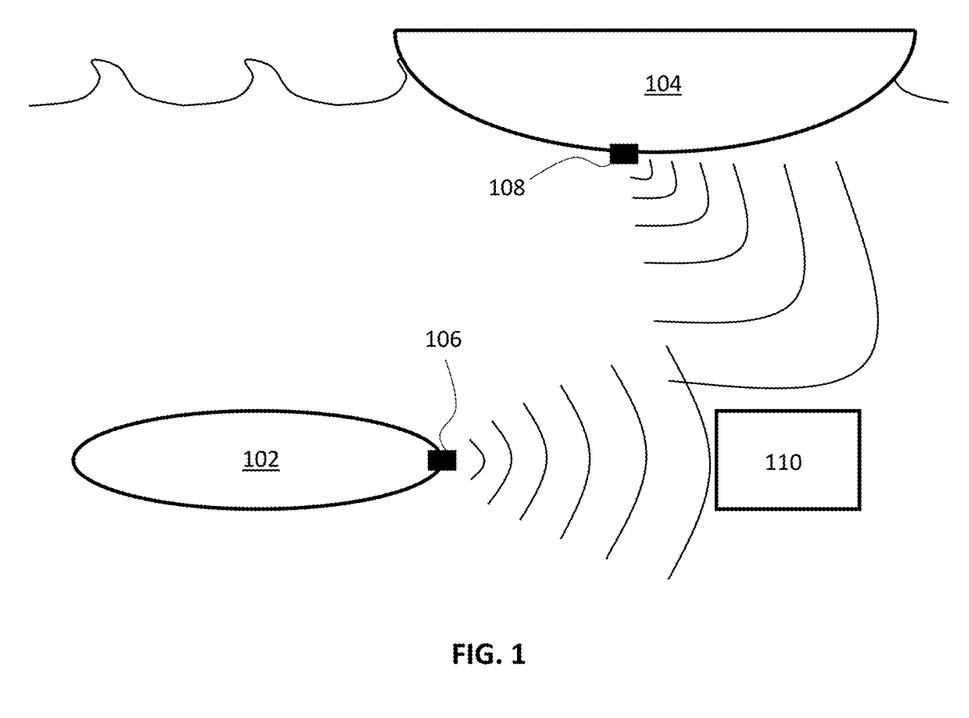
FIG. 1 illustrates the use of sonar from different vessels, in accordance with some embodiments of the present disclosure.

FIG. 1 illustrates the use of sonar to detect an object under the water, according to some embodiments. An underwater vessel 102 can include a transducer array 106 to generate sound waves directed out into the water. Underwater vessel 102 can be a submarine or any other underwater vehicle (including one-man propulsion systems and unmanned vehicles) designed to operate under the water's surface. Transducer array 106 can include any number of electromechanical transducers to generate or receive sound waves. Transducer array 106 can include electromechanical transducers that operate at high duty cycles (e.g., greater than 50%) by using a multi-phase coolant, as discussed in some embodiments herein.

Transducer array 106 produces sound waves that can bounce off of an object 110 under the water. Object 110 may be a sea creature, another submarine or other underwater vessel, a large rock or underwater topography (e.g., reef), or any other physical thing large enough to reflect the generated sound waves. In some examples, object 110 represents the ocean floor.

In some examples, a boat 104 on the surface of the water can also include a transducer array 108 attached to an underside of the hull in the water. Transducer array 108 can be substantially similar to transducer array 106 and can also include electromechanical transducers that operate at high duty cycles (e.g., greater than 50%) by using a multi-phase coolant, as discussed in some embodiments herein.

In still other embodiments, rather than a vessel 102, the transducer array 106 may be included in a non-moving fixture or housing that is placed in the water at a generally fixed location, whether sitting on the floor of the ocean (or other body of water) or suspended in the water by one or more non-moving flotation devices. In one such embodiment, the transducer array 106 can be placed on the floor of the water body, near an intake pipe for a hydroelectric power plant. In such cases, the transducer array 106 can be used for fish mitigation (e.g., discouraging fish from swimming near the intake).

Figure 2A:
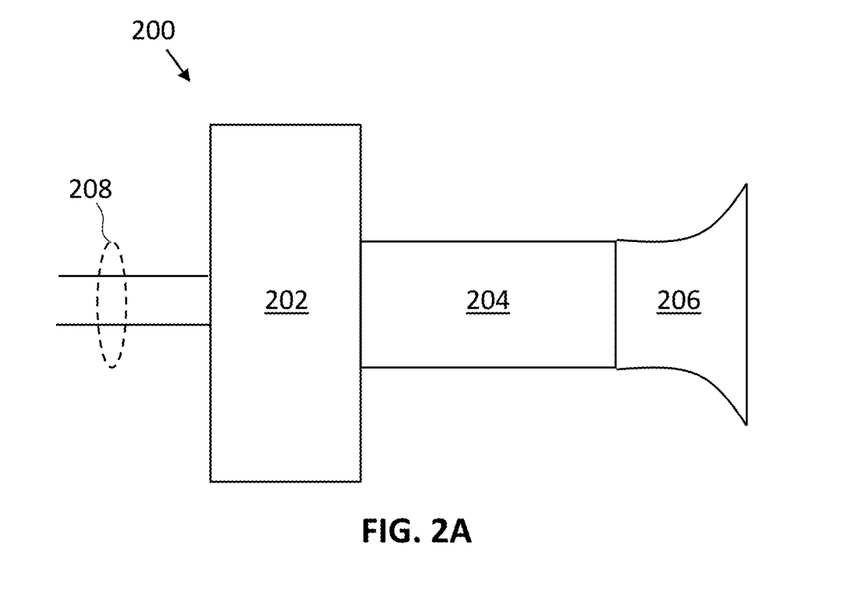
FIGS. 2A-2C illustrate examples of an electromechanical transducer, in accordance with some embodiments of the present disclosure.
Figure 2B:
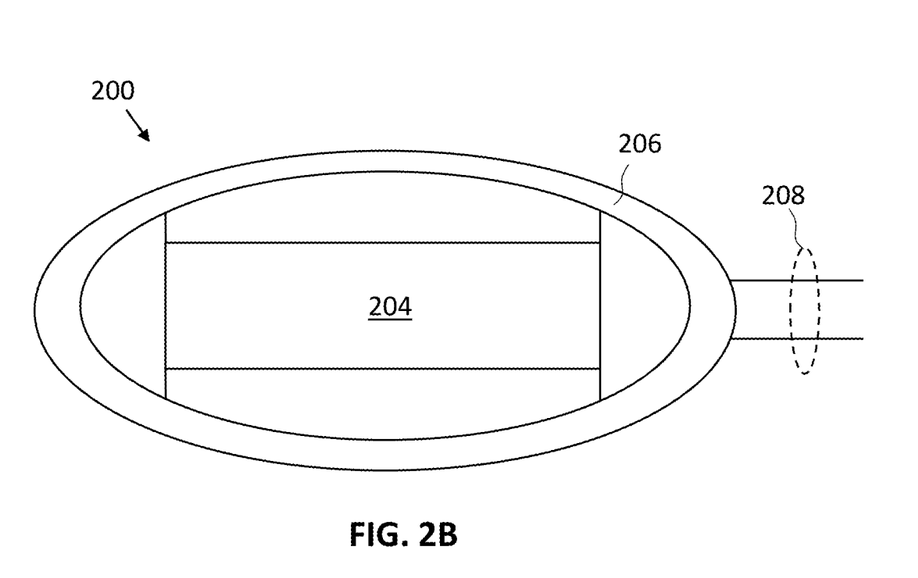
Figure 2C:
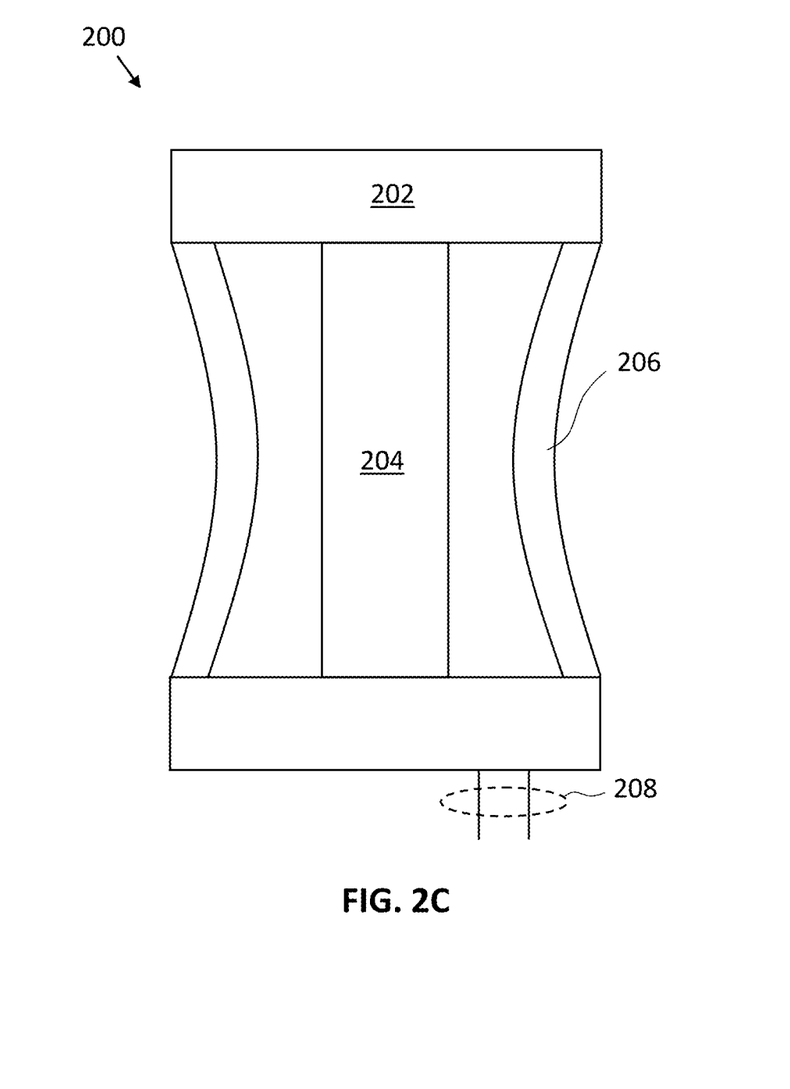

FIGS. 2A-2C illustrate various examples of an electromechanical transducer 200, according to some embodiments. FIG. 2A illustrates a tonpiltz style transducer, FIG. 2B illustrates a flextensional style transducer, and FIG. 2C illustrates a barrel stave style transducer. Each of electromechanical transducers 200 share similar structure that perform the same functions, and thus are described together herein. As used herein, electromechanical transducer 200 may refer to any of the transducers illustrated in FIGS. 2A-2C. Electromechanical transducer 200 may be used in a sonar system to generate or receive sound waves. Electromechanical transducer 200 may be used in other applications that use sound, such as for generating or receiving acoustic waves or for simple acoustic devices such as speakers and microphones.

According to some embodiments, electromechanical transducer 200 includes a tail mass 202, a transducer region 204, and a head mass 206. As illustrated in FIG. 2B, the flextensional style transducer does not use a tail mass 202. Electrical connections 208 may also be provided to transducer region 204. Tail mass 202 may be a solid metal material, such as steel, and head mass 206 may be a lighter metal material, such as aluminum, although any number of materials can be used for the tail mass 202 and head mass 206, including non-metals (e.g., plastics such as poly vinyl chloride and composites). Depending on the application, and according to some embodiments, head mass 206 and tail mass 202 may each be any material as long as head mass 206 is lighter than tail mass 202. By ensuring that head mass 206 is lighter than tail mass 202, head mass 206 will vibrate at a greater amplitude compared to tail mass 202 and can generate high-intensity sound waves. Other configurations will be appreciated in light of this disclosure, including those that simply include transducer region 204 without one or either of the tail mass 202 and head mass 206. Head mass 206 may also be any radiating surface for the acoustic waves. Transducer region 204 may include a plurality of stacked transducers made of a single crystalline polymer material.

Transducer region 204 acts like a spring between head mass 206 and tail mass 202 (or a spring between various portions of head mass 206 as used in the flextensional style illustrated in FIG. 2B), and includes a piezoelectric ceramic material, according to an embodiment. Examples of piezoelectric ceramic materials include barium titinate, lead zirconate titanate, and single crystal piezoelectric materials like $Pb(Mg_{1/3}Nb_{2/3})O_3$—$PbTiO_3$ (PMN—PT). Such materials produce an electric charge when a mechanical stress is applied and vice versa. In some embodiments, transducer region 204 includes one or more piezoelectric crystals such as quartz, Rochelle salt, or ammonium dihydrogen phosphate. In some embodiments, transducer region 204 includes one or more magnetostrictive materials that expand or contract in response to a magnetic field. In a more general sense, any number of transducer mechanisms can be used to implement the transducer region 204.

When used for sonar, electromechanical transducer 200 may be encapsulated in a waterproof housing, and head mass 206 is acoustically coupled to the water. When used as a transmitter, an oscillating electrical voltage is connected across electrodes of transducer region 204 via electrical connections 208 causing transducer region 204 to alternately lengthen and contract. This in turn causes head mass 206, which is acoustically coupled to the water, to vibrate large amplitudes and produce a sound pressure wave. As a receiver, a sound pressure wave pushes head mass 206, causing transducer region 204 to vibrate. This causes the length of the piezoelectric ceramic material to alternately contract and expand, which generates a voltage across transducer region 204. The generated voltage can be measured out with electrical connections 208.

As transducer region 204 converts the electrical energy into mechanical movement, it also releases heat. More heat is released as the duty cycle (duration for which power is applied to the electrodes of transducer region) increases, thus limiting how much electromechanical transducer 200 can be driven if the heat is not compensated for in some way.

Figure 3A:
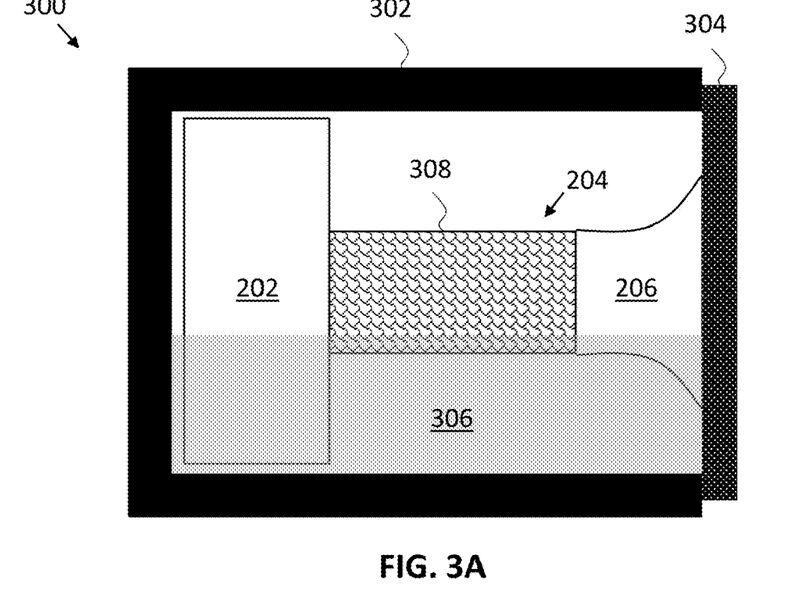
FIG. 3A illustrates a view of a transducer system, in accordance with an embodiment of the present disclosure.
Figure 3B:
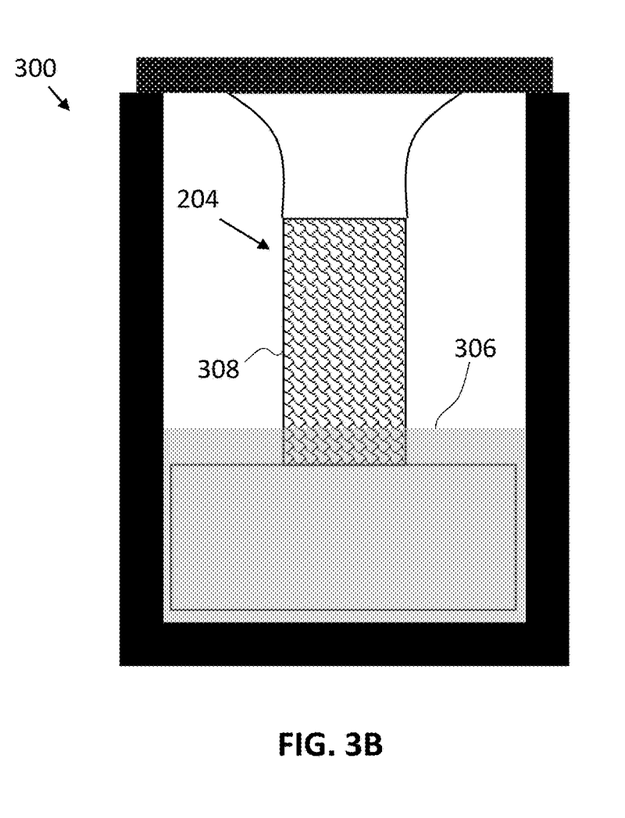
FIG. 3B illustrates another view of the transducer system depicted in FIG. 3A, in accordance with an embodiment of the present disclosure.

FIGS. 3A and 3B illustrate two views of a transducer system 300, according to some embodiments. FIG. 3A illustrates transducer system 300 sitting horizontally with respect to gravity while FIG. 3B illustrates transducer system 300 sitting vertically with respect to gravity. Although FIGS. 3A and 3B illustrate the use of the tonpiltz style transducer of FIG. 2A, any electromechanical transducer 200 style from FIGS. 2A-2C may be used. Any other electromechanical transducer style may be used as well.

Transducer system 300 includes a housing 302 around an electrochemical transducer having at least transducer region 204 and head mass 206. In some embodiments, one wall of housing 302 is replaced by a booting 304. Booting 304 may include rubber or some other polymer material that can vibrate along with head mass 206, but also seals the interior of housing 302. In some embodiments, booting 304 includes an interior wall facing into housing 302 and an exterior wall in contact with water during operation of transducer system 300. Housing 302 may be any metal material, such as aluminum, or any plastic. In some embodiments, housing 302 is a material that is chosen for having a relatively high thermal conductivity, to further aid in heat dissipation.

According to some embodiments, a multi-phase coolant 306 fills a portion of the interior of housing 302. For some example transducer designs and applications, a temperature at or above about 60° C. has been found to cause unacceptable signal degradation and performance of the transducer. Accordingly, coolant 306 may be a solution having a boiling point less than 60° C., such that it transitions from a liquid phase to a gaseous phase at or around 60° C. The evaporating coolant causes more rapid cooling of transducer region 204 in an attempt to keep the temperature from increasing above about 60° C. In one example, coolant 306 is Fluorinert™ FC-72 (3M Materials, St. Paul, Minn.), which has a boiling point of 56° C. (generically referred to as perfluorohexane, or $C_6F_{14}$). There are a number of such two-phase coolants, each having a temperature where transition between liquid and vapor phases takes place, and any such coolants can be used, depending on the particulars of a given application (such as desired transition temperature and toxicity).

According to some embodiments, a wicking material 308 is provided adjacent to transducer region 204. Wicking material 308 may be wrapped around and in direct contact with transducer region 204. Wicking material 308 may be any material that absorbs liquid coolant 306. In some embodiments, liquid coolant 306 fills a volume of the interior of housing 302 that does not entirely cover transducer region 204, but that covers at least a portion of wicking material 308. Multi-phase coolant 306 may then be provided around transducer region 204 by being absorbed through wicking material 308 via capillary action. Wicking material 308 may be cotton or any other material having one or more fibers that can wrap continuously around transducer region 204. Wicking material 308 may be any fluid-transferring membrane material.

In some embodiments, coolant 306 fills between 15% and 30% of the volume inside housing 302, when in its liquid phase. If too much liquid coolant 306 is used within housing 302, it may dampen the movement of head mass 206 and hinder the generation of the sound waves. In some embodiments, liquid coolant 306 fills a volume within the housing such that the coolant solution is in contact with at least a portion of the wicking material. Liquid coolant 306 may contact a portion of wicking material 308 regardless of the orientation of transducer system 300 as shown in FIG. 3B. Even when orientated vertically, liquid coolant 306 still contacts a portion of wicking material 308, such that it can be drawn up and wicked across transducer region 204.

Figure 4:
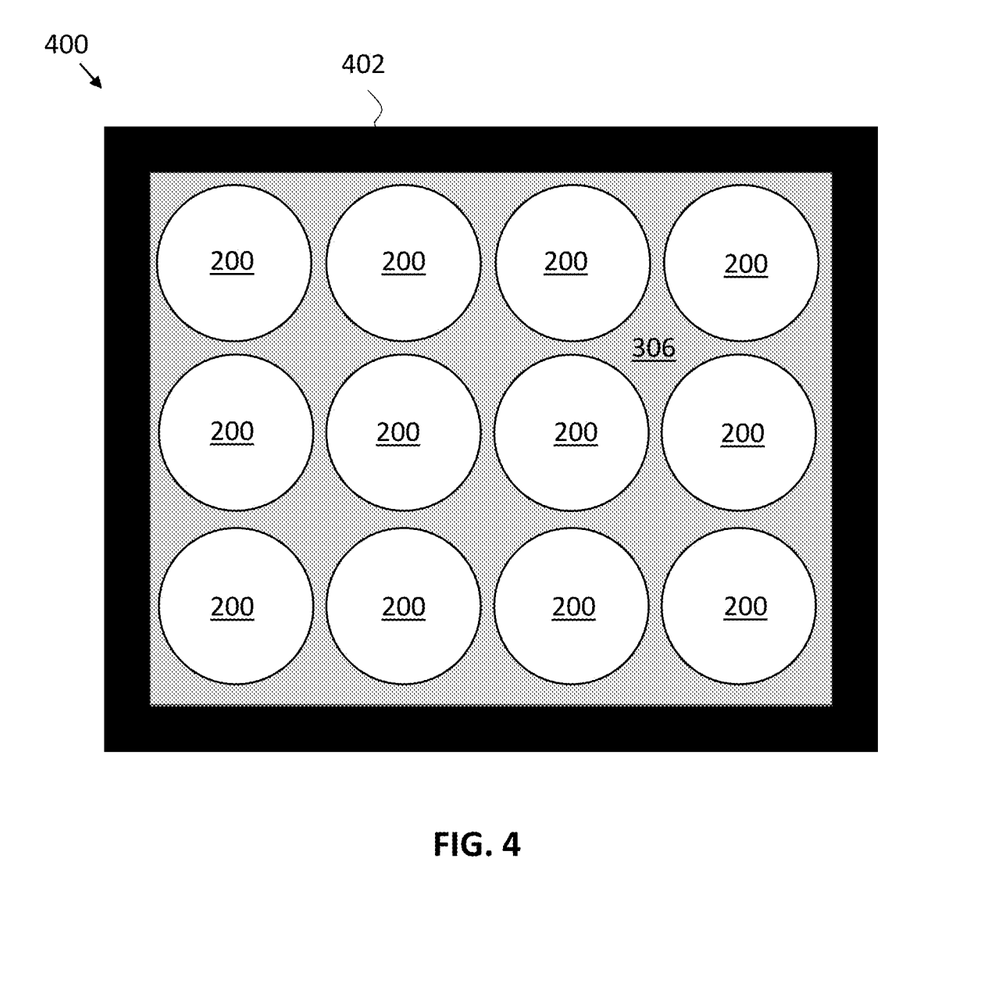
FIG. 4 illustrates a transducer array system, in accordance with an embodiment of the present disclosure.

FIG. 4 illustrates a top-down view of another transducer system 400 that includes a plurality of electromechanical transducers 200 arranged within a housing 402, according to an embodiment. Liquid coolant 306 fills a portion of the volume within housing 402 such that liquid coolant contacts a portion of each of electromechanical transducers 200. One or more of electromechanical transducers 200 may include a wicking material as described in FIG. 3 to bring liquid coolant 306 into closer contact with the transducer region of the one or more of electromechanical transducers 200. Liquid coolant 306 may fill between 15% and 30% of the volume inside housing 402. Housing 402 may be any metal material, such as aluminum.

Any number of electromechanical transducers 200 may be included in housing 402, whether one, two, three, . . . , ten, twenty, etc. Furthermore, the plurality of electromechanical transducers 200 may be arranged in any pattern within housing 402, or even randomly placed in some cases. Various ones of the plurality of electromechanical transducers 200 may be different sizes to produce sound waves having different frequencies or amplitudes, thereby providing a broader spectrums of sound waves. Electrical connection may be made to each of electromechanical transducers 200 such that they operate in unison, or individual electrical connection may be made to one or more of the electromechanical transducers 200 such that they can operate independently from one another.

Figure 5A:
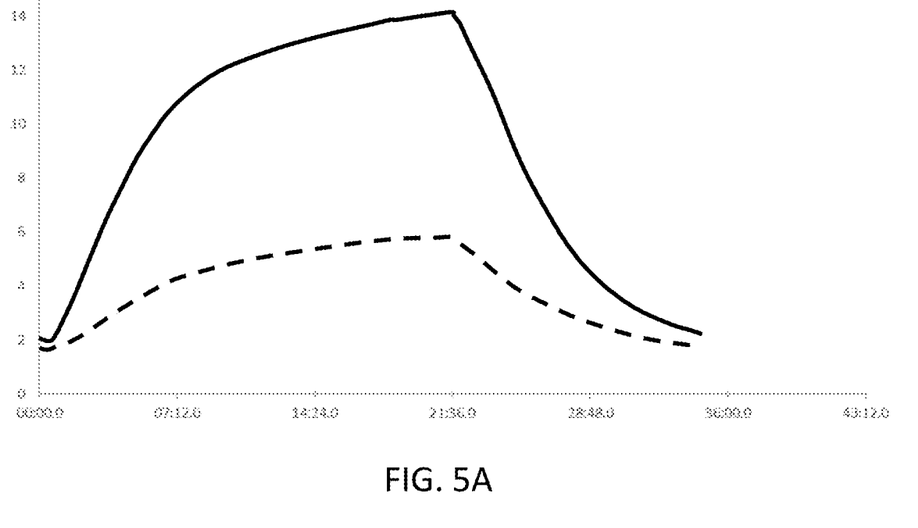
FIGS. 5A and 5B illustrate data plots of temperature over time for an electromechanical transducer, in accordance with some embodiments of the present disclosure.
Figure 5B:
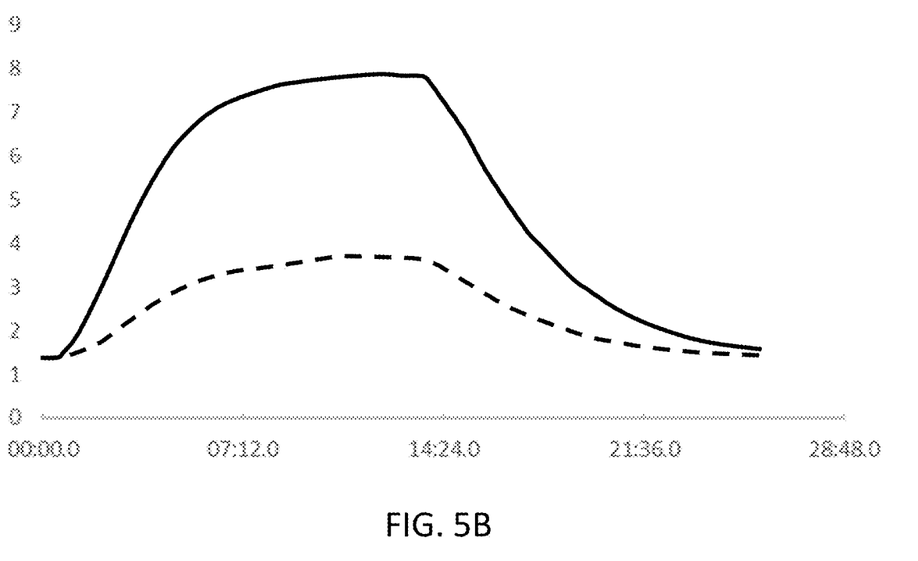

FIGS. 5A and 5B are data graphs illustrating the measured change in temperature over time for an example transducer system operating continuously at a max drive voltage of about 200 volts and a duty cycle of about 50% without liquid coolant (FIG. 5A) and with liquid coolant (FIG. 5B) in accordance with some of the embodiments described herein. The transducer system is also operated while submerged about 10 feet within a body of water. The solid line provides the measured temperature at the transducer region of a given electrochemical transducer in the example transducer system, while the dashed line provides the measured temperature at the tail mass of the given electrochemical transducer in the example transducer system. The measured temperature at the transducer region is higher than the measured temperature at the tail mass throughout the operation of the example transducer system.

The measured temperature at the transducer region raises to about 14 degrees C. without the liquid coolant while the measured temperature at the transducer region raises to only about 8 degrees C. when the liquid coolant is used. Accordingly, at a relatively low operating power, the operating temperature of the transducer region was reduced by about 6 degrees.

Figure 6:
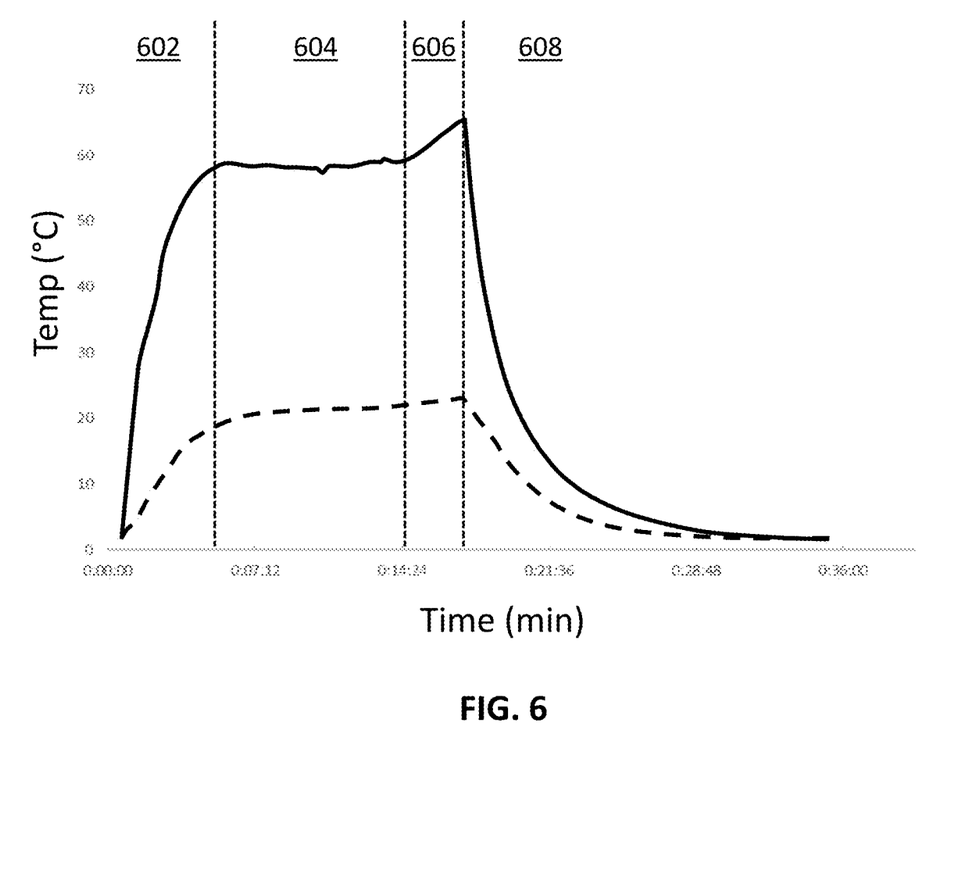
FIG. 6 illustrates another data plot of temperature over time for an electromechanical transducer, in accordance with an embodiment of the present disclosure.

FIG. 6 is a data graph illustrating the measured change in temperature over time for an example transducer system operating continuously at a max drive voltage of about 950 volts and a duty cycle of about 75% while using liquid coolant in accordance with some of the embodiments described herein. The transducer system is also operated while submerged about 10 feet within a body of water. The solid line provides the measured temperature at the transducer region of a given electrochemical transducer in the example transducer system, while the dashed line provides the measured temperature at the tail mass of the given electrochemical transducer in the example transducer system.

The data can be split into four different time regions where different events are occurring. At a first region 602, the temperature steadily rises as the transducer system begins its operation and the transducer region heats up. The presence of the liquid coolant around the transducer region may slow this temperature increase (e.g., decrease the slope). During first region 602, the liquid coolant remains in a liquid phase.

At a second region 604, the temperature has reached the boiling point of the liquid coolant and the coolant begins to evaporate. The evaporating coolant provides highly effective heat transfer through convection, and thus the measured temperature begins to stabilize around the boiling point of the liquid coolant. In this example, the liquid coolant has a boiling point of about 56° C., and this is consistent with what is shown in the graph where the temperature stabilizes around 56° C. in second region 604.

When the liquid coolant evaporates as it moves away from the hot transducer region, it may condense on the interior walls of the housing and thus return to liquid form to replenish the coolant around the transducer region. In some embodiments, the cycle of evaporation and condensing is such that at least some liquid coolant is always sustained around the transducer region.

At a third region 606, the measured temperature again begins to rise. This second rise in temperature may be due to total evaporation of the liquid coolant, thus causing thermal runaway around the transducer region. Accordingly, the useful "operating period" of the transducer system may be the time up until the start of third region 606. In some embodiments, this operating period may be extended by using more coolant liquid, or by using a different wicking design that more effectively draws the coolant liquid around the transducer region.

At a fourth region 608, power is shut off to the transducer system, and the measured temperature falls sharply.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a transducer system that includes a housing, an electromechanical transducer within the housing, a wicking material, and a coolant solution. The wicking material is adjacent to a portion of the electromechanical transducer. The coolant solution is within the housing and transitions from a liquid phase to a gaseous phase in response to a temperature of the electromechanical transducer exceeding a threshold temperature.

Example 2 includes the subject matter of Example 1, wherein the electromechanical transducer comprises a piezoelectric ceramic material.

Example 3 includes the subject matter of Example 2, wherein the wicking material is adjacent to the piezoelectric ceramic material.

Example 4 includes the subject matter of Example 2 or 3, wherein the wicking material is wrapped around the piezoelectric ceramic material.

Example 5 includes the subject matter of Example 1, wherein the electromechanical transducer comprises an electro-mechanical driver or a magneto-mechanical driver.

Example 6 includes the subject matter of Example 5, wherein the wicking material is adjacent to the electro-mechanical driver or the magneto-mechanical driver.

Example 7 includes the subject matter of Example 5 or 6, wherein the wicking material is wrapped around the electro-mechanical driver or the magneto-mechanical driver.

Example 8 includes the subject matter of any of Examples 1-7, wherein the coolant solution does not completely fill a volume within the housing.

Example 9 includes the subject matter of any of Examples 1-8, wherein the coolant solution fills between 15% and 30% of a volume within the housing.

Example 10 includes the subject matter of any of Examples 1-9, wherein the coolant solution fills a volume within the housing such that the coolant solution is in contact with at least a portion of the wicking material.

Example 11 includes the subject matter of any of Examples 1-10, wherein the wicking material comprises a fluid-transferring membrane material.

Example 12 includes the subject matter of any of Examples 1-11, wherein the wicking material comprises cotton.

Example 13 includes the subject matter of any of Examples 1-12, wherein the coolant solution has a boiling point of less than about 60° C., and the threshold temperature is about the same as the boiling point of the coolant solution.

Example 14 includes the subject matter of any of Examples 1-13, wherein the coolant solution has a boiling point less than a critical temperature of the electromechanical transducer.

Example 15 is a transducer system including a housing, a plurality of electromechanical transducers in the housing, and a coolant solution within the housing. One or more of the plurality of electromechanical transducers comprises a wicking material adjacent to a portion of the corresponding electromechanical transducer. The coolant solution transitions from a liquid phase to a gaseous phase in response to a temperature of the electromechanical transducer exceeding a threshold temperature.

Example 16 includes the subject matter of Example 15, wherein one or more of the plurality of electromechanical transducers comprises a piezoelectric ceramic material.

Example 17 includes the subject matter of Example 16, wherein the wicking material is adjacent to the piezoelectric ceramic material.

Example 18 includes the subject matter of Example 16 or 17, wherein the wicking material is wrapped around the piezoelectric ceramic material.

Example 19 includes the subject matter of Example 15, wherein one or more of the plurality of electromechanical transducers comprises an electro-mechanical driver or a magneto-mechanical driver.

Example 20 includes the subject matter of Example 19, wherein the wicking material is adjacent to the electro-mechanical driver or the magneto-mechanical driver.

Example 21 includes the subject matter of Example 19 or 20, wherein the wicking material is wrapped around the electro-mechanical driver or the magneto-mechanical driver.

Example 22 includes the subject matter of any of Examples 15-21, wherein the coolant solution does not completely fill a volume within the housing.

Example 23 includes the subject matter of any of Examples 15-22, wherein the coolant solution fills between 15% and 30% of a volume within the housing.

Example 24 includes the subject matter of any of Examples 15-23, wherein the coolant solution fills a volume within the housing such that the coolant solution is in contact with at least a portion of the wicking material.

Example 25 includes the subject matter of any of Examples 15-24, wherein the wicking material comprises a fluid-transferring membrane material.

Example 26 includes the subject matter of any of Examples 15-25, wherein the wicking material comprises cotton.

Example 27 includes the subject matter of any of Examples 15-26, wherein the coolant solution has a boiling point of less than about 60° C., and the threshold temperature is about the same as the boiling point of the coolant solution.

Example 28 includes the subject matter of any of Examples 15-27, wherein the coolant solution has a boiling point less than a critical temperature of the electromechanical transducer.

Example 29 is a sonar system including a housing, a sonar transducer within the housing, a wicking material, and a coolant solution. The wicking material is adjacent to a portion of the sonar transducer. The coolant solution is within the housing and transitions from a liquid phase to a gaseous phase in response to a temperature of the sonar transducer exceeding a threshold temperature.

Example 30 includes the subject matter of Example 29, wherein the sonar transducer comprises a piezoelectric ceramic material.

Example 31 includes the subject matter of Example 30, wherein the wicking material is adjacent to the piezoelectric ceramic material.

Example 32 includes the subject matter of Example 30 or 31, wherein the wicking material is wrapped around the piezoelectric ceramic material.

Example 33 includes the subject matter of Example 29, wherein the sonar transducer comprises an electro-mechanical driver or a magneto-mechanical driver.

Example 34 includes the subject matter of Example 33, wherein the wicking material is adjacent to the electro-mechanical driver or the magneto-mechanical driver.

Example 35 includes the subject matter of Example 33 or 34, wherein the wicking material is wrapped around the electro-mechanical driver or the magneto-mechanical driver.

Example 36 includes the subject matter of any of Examples 29-35, wherein the coolant solution does not completely fill a volume within the housing.

Example 37 includes the subject matter of any of Examples 29-36, wherein the coolant solution fills between 15% and 30% of a volume within the housing.

Example 38 includes the subject matter of any of Examples 29-37, wherein the coolant solution fills a volume within the housing such that the coolant solution is in contact with at least a portion of the wicking material.

Example 39 includes the subject matter of any of Examples 29-38, wherein the wicking material comprises a fluid-transferring membrane material.

Example 40 includes the subject matter of any of Examples 29-39, wherein the wicking material comprises cotton.

Example 41 includes the subject matter of any of Examples 29-40, wherein the coolant solution has a boiling point of less than about 60° C., and the threshold temperature is about the same as the boiling point of the coolant solution.

Example 42 includes the subject matter of any of Examples 29-41, wherein the coolant solution has a boiling point less than a critical temperature of the sonar transducer.

What is claimed is:

1. A transducer system, comprising:
   a housing;
   an electromechanical transducer within the housing;
   a wicking material adjacent to a portion of the electro-mechanical transducer; and
   a coolant solution within the housing, wherein the coolant solution transitions from a liquid phase to a gaseous phase in response to a temperature of the electromechanical transducer exceeding a threshold temperature.

2. The transducer system of claim 1, wherein the electromechanical transducer comprises a piezoelectric ceramic material.

3. The transducer system of claim 2, wherein the wicking material is adjacent to the piezoelectric ceramic material.

4. The transducer system of claim 2, wherein the wicking material is wrapped around the piezoelectric ceramic material.

5. The transducer system of claim 1, wherein the coolant solution fills between 15% and 30% of a volume within the housing.

6. The transducer system of claim 1, wherein the coolant solution fills a volume within the housing such that the coolant solution is in contact with at least a portion of the wicking material.

7. The transducer system of claim 1, wherein the coolant solution has a boiling point of less than about 60° C., and the threshold temperature is about the same as the boiling point of the coolant solution.

* * * * *